Patented Oct. 6, 1953

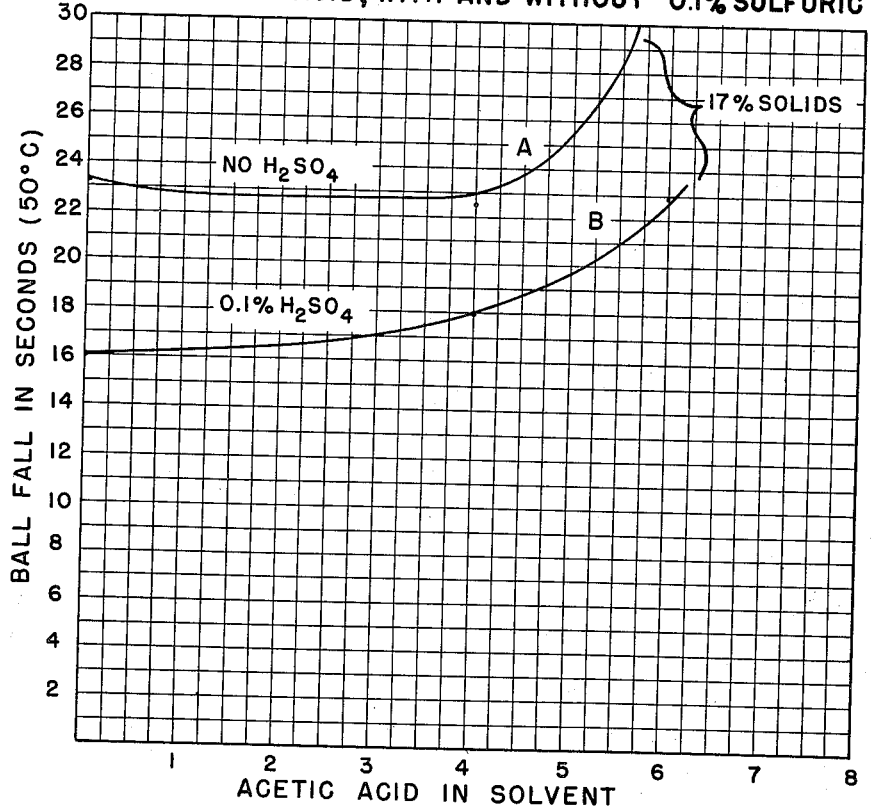

2,654,721

UNITED STATES PATENT OFFICE 2,654,721

SOLUTIONS OF POLYMERIC MATERIALS COMPRISING AT LEAST 80 PER CENT OF POLYMERIZED ACRYLONITRILE

Marion R. Lytton, West Chester, Pa., assignor, by mesne assignments, to The Chemstrand Corporation, Decatur, Ala., a corporation of Delaware Application June 11, 1951, Serial No. 230,886

14 Claims. (Cl. 260—30.8)

This invention relates to solutions of polymeric material comprising at least 80% of polymerized acrylonitrile in a mixture of N,N-dimethylacetamide, acetic acid, and sulfuric acid.

N,N-dimethylacetamide is usually obtained by reacting dimethylamine with acetic acid and contains a considerable amount of unreacted acetic acid in the form of an azeotropic mixture. The presence of acetic acid in dimethylacetamide has an effect on the viscosity of solutions or dispersions of the acrylonitrile polymers in the dimethylacetamide, the magnitude of which depends on the amount of acetic acid present, and may be such that the viscosity of the solution or dispersion is increased by the acetic acid to the extent that the solution or dispersion cannot be spun into fibers or cannot be spun without encountering serious spinning difficulties. The prior art teaches that while compositions of dimethylacetamide and acrylonitrile polymers and copolymers may tolerate traces of acetic acid any appreciable amounts of acetic acid cause viscosity and solubility changes which present spinning difficulties. For this reason, the use of dimethylacetamide as a solvent for polyacrylonitrile and copolymers high in acrylonitrile has been recommended only when substantially free from acetic acid.

The viscosity of a solution of an acrylonitrile polymer can be determined empirically by the standard ball fall test and stated in terms of the time required for a steel ball having a diameter of our-fourth of an inch to fall through a 4" vertical column of the resin solution contained in a test tube of one and one-half inch diameter.

Thus, the presence of even minute amounts of acetic acid in the dimethylacetamide effects an increase in the viscosity of a solution of polymeric material comprising at least 80% by weight of polymerized acrylonitrile therein which can be measured by the ball fall test, regardless of the concentration of the polymer in solution and as compared to the viscosity of a solution of the polymeric material of corresponding concentration in diamethylacetamide which does not contain acetic acid. This increase in viscosity is found to cause spinning difficulties.

It is now found that when a solvent comprising N,N-dimethylacetamide and acetic acid in substantial amounts, for example, from 2% up to even 8% by weight of acetic acid, and 0.05% to 0.25% by weight of sulphuric or sulphamic acid is used for polymeric material comprising at least 80% of polymerized acrylonitrile, the difficulties referred to above are overcome. The sulfuric acid or sulfamic acid lowers the viscosity and improves the spinnability of the solutions regardless of the exact composition of the polymeric material, the concentration thereof, or the temperature at which the viscosity is measured or at which the solution is to be spun. Normally, the viscosity of solutions of from 10 to 20% of the polymeric material comprising at least 80% of polymerized acrylonitrile in dimethylacetamide containing substantial amounts of acetic acid is so high that spinning difficulties are presented under conventional conditions. It is found, however, that if 0.05 to 0.25% by weight of sulfuric or sulfamic acid is added to dimethylacetamide containing substantial amounts of acetic acid, the deleterious effects usually exhibited by the acetic acid on the viscosity of the solutions are counteracted, and the viscosity is lowered to a point where spinning is again commercially practical under conventional conditions. Solutions of from 10 to 30%, preferably from 10 to 20%, of the polymeric material in the dimethylacetamide - acetic acid - sulfuric acid mixture can be readily spun into fibers without difficulty. This is unexpected not only in view of the findings of the art and the assumption of prior art workers that N,N-dimethylacetamide must be substantially free of acetic acid, before it can be used successfully as a solvent for the polymers, but also because strong polar solvents of the type of acetic acid are extremely poor solvents for the high acrylonitrile polymers and tend to precipitate them from solution.

The polymeric material which is dissolved in a mixture of dimethylacetamide, acetic acid, and sulfuric or sulfamic acid, and formed into shaped articles in accordance with this invention may be polyacrylonitrile, copolymers, such as binary or ternary copolymers containing at least 80% by weight of acrylonitrile in the polymer molecule, or a blend comprising polyacrylonitrile or copolymers comprising acrylonitrile with from 2 to 50% of another polymeric material, the blend having an overall acrylonitrile polymer content of at least 80% by weight. The term "polymeric material comprising at least 80% of polymerized acrylonitrile," as used herein is intended to include polymers, and interpolymers, copolymers, and blends in which the polymerized acrylonitrile is present in an amount of at least 80% by weight.

For example, the polymeric material dissolved in the mixtures of the invention may be polyacrylonitrile or a binary interpolymer of from 80 to 98% acrylonitrile and from 2 to 20% of another substance containing the >C=C< linkage and interpolymerizable with acrylonitrile. Suitable monomers for interpolymerization with acrylonitrile include acrylic, alpha-chloracrylic, and methacrylic acids; the acrylates such as methylmethacrylate, ethylmethacrylate, butylmethacrylate, octylmethacrylate, 2-nitro-2-methylpropylmethacrylate, methoxymethylmethacrylate, betachlorethylmethacrylate, and the corresponding esters of acrylic and alphachloracrylic acids; vinyl chloride, vinyl fluoride, vinyl bromide, vinylidene chloride, 1-chloro-1-bromoethylene, 1,1-difluoro-ethylene; methacrylonitrile; acrylamide and methacrylamide; alpha-chloracrylamide, or monoalkyl substitution products thereof; methylvinyl ketone and methyl isopropenyl ketones; vinyl carboxylates such as vinyl acetate, vinyl chloroacetate, vinyl propionate, and vinyl stearate; N-vinylimides such as N-vinylphthalimide and N-vinylsuccinimide; methylene malonic esters; itaconic acid and itaconic esters; trifluorochlorethylene; N-vinylcarbazole; vinyl furane; butyl vinyl sulfone; propylene; isobutylene, butene-1 and butene-2; alkyl vinyl esters; vinyl sulfonic acid; ethylene alpha,beta-dicarboxylic acids or their anhydrides or derivatives such as diethylfumarate, diethyl maleate, diethylcitraconate, diethylmesaconate; styrene; vinyl naphthalene; vinyl-substituted tertiary heterocyclic amines such as the vinylpyridines and alkyl substituted vinylpyridines for example 2-vinylpyridine and 5-methyl-2-vinylpyridine, 1-vinyl imidazoles and alkyl substituted 1-vinylimidazoles such as 2-, 4-, or 5-methyl-1-vinylimidazole, and other >C=C< containing polymerizable materials. Or, the polymer may be a ternary interpolymer, for example products obtained by the interpolymerization of acrylonitrile and two or more of any of the monomers other than acrylonitrile enumerated above. More specifically, and preferably, the ternary polymer comprises acrylonitrile, methacrylonitrile, and 2-vinylpyridine, vinyl chloride or a 1-vinylimidazole. The ternary polymers preferably contain from 80 to 98% of acrylonitrile, from 1 to 10% of a vinylpyridine or a 1-vinylimidazole, and from 1 to 18% of another substance such as methacrylonitrile or vinyl chloride. The polymeric material dissolved in the mixtures of the invention may also be a blend of polyacrylonitrile or of a binary interpolymer of from 80 to 98% acrylonitrile and from 1 to 20% of at least one other >C=C< containing substance with from 2 to 50% on the weight of the blend of a copolymer of from 10 to 70% of acrylonitrile and from 30 to 90% of at least one other >C=C< containing polymerized monomer. Preferably, when the polymeric material comprises a blend, it will be a blend of a binary interpolymer of acrylonitrile and from 2 to 10% of another substance such as vinyl acetate, which is not receptive to dyestuffs, with a sufficient amount of a binary interpolymer of from 10 to 70% of acrylonitrile and from 30 to 90% of a vinyl-substituted tertiary heterocyclic amine such as vinylpyridine or a 1-vinylimidazole, to give a dyeable blend having an overall vinyl-substituted tertiary heterocyclic amine content of from 2 to 10% on the weight of the blend.

The effect of the sulfuric acid on the viscosity of solutions of the acrylonitrile polymers in N,N-dimethylacetamideacetic acid mixtures is illustrated in the accompanying graph wherein the proportion of acetic acid in the solvent is plotted against the ball fall in seconds at 50° C.

Referring to the graph, curves A and B show the viscosities of solutions containing 17% by weight of a polymeric material comprising a copolymer of acrylonitrile and 2-vinylpyridine having an overall content of 6% of 2-vinylpyridine in dimethylacetamideacetic acid mixtures. Curve A represents a solution which does not contain sulfuric acid or sulfamic acid; curve B represents a solution which contains 0.1% by weight of sulfuric acid. The following table was compiled from the graph:

Viscosity in seconds at 50° C.

| Acetic Acid in Percent | No Sulfuric Acid | 0.1% Sulfuric Acid |
|---|---|---|
| 2 | 22.9 | 16.9 |
| 3 | 22.9 | 17.0 |
| 4 | 23.0 | 18.0 |
| 5 | 25.2 | 19.8 |
| 6 | over 30.0 | 22.9 |

In preparing solutions of the polymeric material comprising at least 80% of polymerized acrylonitrile in accordance with this invention, it is preferred to dissolve 0.05 to 0.25% of sulfuric or sulfamic acid in dimethylacetamide containing substantial amounts of acetic acid, for example from 2% to 8% by weight, at room temperature, and to then dissolve the selected polymeric material in the mixture. The solutions may be spun into fibers by either the dry or wet spinning method. Suitable setting baths for use in the wet spinning method include water, glycerol, mixtures of water and dimethylacetamide, etc.

EXAMPLE

Spinning solutions as represented by curve B of the graph were prepared as follows:

A binary interpolymer containing, by weight in the polymer molecule, from 90 to 98% of acrylonitrile and from 2 to 10% of vinyl acetate was blended with a sufficient amount of a binary interpolymer containing, by weight in the polymer molecule, from 10 to 70% of acrylonitrile and from 30 to 90% of 2-vinylpyridine, to obtain a blend having an overall 2-vinylpyridine content of 6%. Different portions of the blend thus obtained were dissolved in mixtures consisting of N,N-dimethylacetamide, acetic acid, and 0.1% sulfuric acid to obtain 17% solutions of the blend respectively. The viscosity of all of the solutions was determined and plotted on the graph. The dimethylacetamide solutions containing the sulfuric acid and acetic acid in an amount of 2, 4 and 6% respectively were extruded through a spinneret into a mixture of water and dimethylacetamide to obtain fibers. The spinning was accomplished without difficulty. The fibers were withdrawn from the bath collected in the form of a filamentary bundle or tow, and processed in that condition. The tow of distinct and separate filaments was washed with water and heat-stretched for orientation during processing thereof, which also included the application of a conditioning agent to the tow.

The above disclosure and examples are intended to be illustrative only. Any modification thereof or variation therefrom which conforms to the spirit of the invention is intended to be included within the scope of the claims.

I claim:

1. As a composition of matter, a solution of N,N-dimethylacetamide containing dissolved therein, a polymeric material comprising at least 80% by weight of polymerized acrylonitrile, from 2% to about 8% by weight of acetic acid, and from 0.05 to 0.25% of an acid selected from the group consisting of sulfuric acid and sulfamic acid, based on the weight of the solution, said solution having a viscosity in the range suitable for spinning shaped articles therefrom.

2. A solution as in claim 1, wherein the polymeric material is a binary interpolymer containing, by weight in the polymer molecule, from 90 to 98% acrylonitrile and from 2 to 10% of a vinyl-substituted tertiary heterocyclic amine.

3. A solution as in claim 1, wherein the polymeric material is a binary interpolymer containing, by weight in the polymer molecule, from 90 to 98% acrylonitrile and from 2 to 10% of a vinylpyridine.

4. A solution as in claim 1, wherein the polymeric material is a binary interpolymer containing, by weight in the polymer molecule, from 90 to 98% of acrylonitrile and from 2 to 10% of 2-vinylpyridine.

5. A solution as in claim 1, wherein the polymeric material is a binary interpolymer containing, by weight in the polymer molecule, from 90 to 98% acrylonitrile and from 2 to 10% of a 1-vinylimidazole.

6. A solution as in claim 1, wherein the polymeric material is a ternary interpolymer containing, by weight in the polymer molecule, from 80 to 98% of acrylonitrile, from 1 to 10% of a vinyl-substituted tertiary heterocyclic amine, and from 1 to 18% of methacrylonitrile.

7. A solution as in claim 1, wherein the polymeric material is a blend of an acrylonitrile polymer containing at least 80% by weight of acrylonitrile with from 2 to 50% on the weight of the blend of an interpolymer containing, by weight in the polymer molecule, from 10 to 70% of acrylonitrile and from 30 to 90% of at least one other monomer which contains the >C=C< linkage and is interpolymerizable with acrylonitrile, said polymer totaling 100% of the blend.

8. A solution as in claim 1, wherein the polymeric material is a blend of an acrylonitrile polymer containing, by weight in the polymer molecule, at least 80% of acrylonitrile, with from 2 to 50% on the weight of a blend of a binary interpolymer containing, by weight in the polymer molecule, from 10 to 70% of acrylonitrile and from 30 to 90% of a vinyl-substituted tertiary heterocyclic amine, the overall content of the polymerized amine in the blend being from 2 to 10% by weight.

9. A solution as in claim 1, wherein the polymeric material is a blend of an acrylonitrile polymer containing at least 80% by weight of acrylonitrile in the polymer molecule, with from 2 to 50% on the weight of the blend of a binary interpolymer containing, by weight in the polymer molecule, from 10 to 70% of acrylonitrile and from 30 to 90% of a vinylpyridine, the overall vinylpyridine content of the blend being from 2 to 10% by weight.

10. A solution as in claim 1, wherein the polymeric material is a blend of an acrylonitrile polymer containing at least 80% by weight of acrylonitrile in the polymer molecule, with from 2 to 50% on the weight of the blend of a copolymer containing by weight in the polymer molecule from 10 to 70% of acrylonitrile and from 30 to 90% of 2-vinylpyridine, the overall polymerized 2-vinylpyridine content of the blend being from 2 to 10% by weight.

11. A solution as in claim 1, wherein the polymeric material is a blend of an acrylonitrile polymer containing at least 80% by weight of acrylonitrile in the polymer molecule, with from 2 to 50% on the weight of the blend of a binary interpolymer containing, by weight in the polymer molecule, from 10 to 70% of acrylonitrile and from 30 to 90% of a 1-vinylimidazole, the overall polymerized vinylimidazole content of the blend being from 2 to 10% by weight.

12. A solution comprising from 10 to 30% by weight of a blend of an acrylonitrile polymer containing at least 80% by weight of acrylonitrile in the polymer molecule, with from 2 to 50% on the weight of the blend of a binary interpolymer containing by weight in the polymer molecule, from 10 to 70% of acrylonitrile and from 30 to 90% of a vinyl-substituted tertiary heterocyclic amine, the overall tertiary amine content of the blend being from 2 to 10% by weight, in a mixture comprising dimethylacetamide, from 2 to 8% by weight of acetic acid, and from 0.05 to 0.25% of sulfuric acid, based on the weight of the solution.

13. A solution of a polymeric material comprising at least 80% by weight of polymerized acrylonitrile in a mixture comprising N,N-dimethylacetamide, from 2% to about 8% by weight of acetic acid, and from 0.05 to 0.25% of sulfuric acid.

14. A solution of a polymeric material comprising at least 80% by weight of polymerized acrylonitrile in a mixture comprising N,N-dimethylacetamide, from 2% to about 8% by weight of acetic acid and from 0.05 to 0.25% of sulfamic acid.

MARION R. LYTTON.

References Cited in the file of this patent

UNITED STATES PATENTS

| Number | Name | Date |
| --- | --- | --- |
| 2,502,030 | Scheiderbauer | Mar. 28, 1950 |
| 2,503,245 | Coover | Apr. 11, 1950 |